(12) United States Patent
Lee et al.

(10) Patent No.: US 8,300,317 B2
(45) Date of Patent: Oct. 30, 2012

(54) VARIFOCAL LENS

(75) Inventors: Jeong-yub Lee, Seoul (KR); Seung-wan Lee, Suwon-si (KR); Woon-bae Kim, Suwon-si (KR); Seung-tae Choi, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 12/542,418

(22) Filed: Aug. 17, 2009

(65) Prior Publication Data

US 2010/0165475 A1 Jul. 1, 2010

(30) Foreign Application Priority Data

Dec. 30, 2008 (KR) .................. 10-2008-0137044

(51) Int. Cl.
*G02B 1/06* (2006.01)
*G02B 15/14* (2006.01)

(52) U.S. Cl. .................. 359/666; 359/665; 359/676

(58) Field of Classification Search ........... 359/665–667
See application file for complete search history.

(56) References Cited

U.S. PATENT DOCUMENTS

| 7,755,840 B2* | 7/2010 | Batchko et al. ............... 359/665 |
| 7,826,145 B2* | 11/2010 | Justis et al. ................... 359/666 |
| 2009/0195882 A1* | 8/2009 | Bolle et al. .................... 359/665 |
| 2009/0246546 A1* | 10/2009 | Keppner et al. ............... 428/500 |
| 2009/0310224 A1* | 12/2009 | Yu et al. ........................ 359/666 |
| 2010/0182703 A1* | 7/2010 | Bolis ............................. 359/666 |

FOREIGN PATENT DOCUMENTS

| JP | 60-220301 A | 11/1985 |
| KR | 10-0674866 B1 | 1/2007 |
| KR | 10-2007-0015193 | 2/2007 |
| KR | 10-0723241 B1 | 5/2007 |
| KR | 10-2008-0035252 A | 4/2008 |
| KR | 10-2008-0043106 A | 5/2008 |
| WO | 2005/109074 A1 | 11/2005 |
| WO | WO 2009-010559 | * 1/2009 |

OTHER PUBLICATIONS

Nikolas Chronis et al. "Tunable liquid-filled microlens array integrated with microfluidic network" : Optics Express, vol. 11, No. 19. Sep. 22, 2003: pp. 2370-2378.

* cited by examiner

*Primary Examiner* — Jordan Schwartz
(74) *Attorney, Agent, or Firm* — Sughrue Mion, PLLC

(57) ABSTRACT

Varifocal lens for camera module incorporated in wireless mobile communication device is provided. The varifocal lens includes: a membrane; a frame which is fixed to the membrane and has a receiving hole formed in the middle; a transparent substrate which is fixed to the frame to seal optical fluid received in the receiving hole; one or more actuators to change a curvature of a fluid lens part by bending the circumference of the fluid lens part formed around a central portion of the receiving hole; and a restriction lessening member which is adapted to lessen a restrictive force of an edge of the fluid lens part, is made of a transparent material, has with an area smaller than the fluid lens part to correspond to an inner side of the fluid lens part except the edge of the fluid lens part, and has a larger Young's modulus than the membrane.

24 Claims, 10 Drawing Sheets

VARIFOCAL LENS

CROSS-REFERENCE TO RELATED APPLICATION

This application claims the benefit of Korean Patent Application No. 10-2008-137044, filed on Dec. 30, 2008, at the Korean Intellectual Property Office, the disclosure of which is incorporated by reference in its entirety.

BACKGROUND

1. Field

The following description relates to a varifocal lens for a camera module incorporated in a wireless mobile communication device.

2. Description of the Related Art

A wireless mobile communication device, such as a mobile phone, has evolved to provide a variety of functionalities, such as camera, game, music, broadcast, and Internet, as well as voice and message communications.

In addition, it has been attempted to fabricate a more compact electronic device equipped with more functionalities. A camera module is one of devices which are very difficult to reduce in size.

A phone camera is generally designed to take pictures at a minimum distance of 60 cm, and thus a picture of a business card taken at a distance of about 5 to 10 cm is blurred. To address this problem, several auto-focus technologies using a voice coil motor (VCM) or a step motor have been proposed. However, most of these technologies are disadvantageous in thickness, volume, noise, etc.

Accordingly, a varifocal lens has been proposed which uses a fluid lens part to change a focal length. The varifocal lens is configured to change a curvature of a fluid lens part as optical fluid is injected into or discharged from the fluid lens part.

However, the edge of the fluid lens part is fixed in the varifocal lens, which causes a limitation in profile when the curvature is changed. More specifically, when the fluid lens part is changed to be convex or concave, the fluid lens part only has a specific conic profile since the edge of the fluid lens part is fixed, which may cause a degraded optical performance and a problem in optical design of the entire module. This may also cause a restriction to optical applications.

For example, in a case of an optical design requiring a fluid lens part of a spherical profile, only a small central portion of a fluid lens part of a specific conic profile can be used since only the small central portion is spherical. Accordingly, the entire fluid lens part needs to be spherical to use a wider portion of the lens part.

On the contrary, the fluid lens part needs to be changed in profile for optical designs requiring a sharper conic profile and an aspheric profile.

SUMMARY

The following description relates to a varifocal lens capable of changing a profile of a fluid lens part to be appropriate for various optical applications.

In one general aspect, a varifocal lens includes: a membrane; a frame which is fixed to the membrane and has a receiving hole formed in the middle; a transparent substrate which is fixed to the frame to seal optical fluid received in the receiving hole; an actuator to change a curvature of a fluid lens part by bending the circumference of the fluid lens part provided around a central portion of the receiving hole; and a restriction lessening member which is adapted to lessen a restrictive force of an edge of the fluid lens part, is made of a transparent material, has an area smaller than the fluid lens part to correspond to an inner side of the fluid lens part except the edge of the fluid lens part, and has a larger Young's modulus than the membrane.

In another general aspect, a varifocal lens includes: a membrane; a frame which is fixed to the membrane and has a receiving hole formed in the middle; a transparent substrate which is fixed to the frame to seal optical fluid received in the receiving hole; an actuator to change a curvature of a fluid lens part by bending the circumference of the fluid lens part provided around a central portion of the receiving hole; and a restriction reinforcing member which is adapted to reinforce a restrictive force of an edge of the fluid lens part, is made of a transparent material, is provided to correspond to an area including the edge of the fluid lens part except a central portion of the fluid lens part, and has a larger Young's modulus than the membrane.

In another general aspect, a varifocal lens includes: a membrane; a frame which is fixed to the membrane and has a receiving hole formed in the middle; a transparent substrate which is fixed to the frame to seal optical fluid received in the receiving hole; an actuator to change a curvature of a fluid lens part by bending the circumference of the fluid lens part provided around a central portion of the receiving hole; and a lens shape altering member which is adapted to transform the fluid lens part in a predetermined shape, is made of a transparent material, is provided to correspond to at least a portion of the fluid lens part, and has a Young's modulus equal to or more than that of the membrane.

However, other aspects will be apparent from the following description, the drawings, and the claims.

BRIEF DESCRIPTION OF THE DRAWINGS

Throughout the drawings and the detailed description, unless otherwise described, the same drawing reference numbers refer to the same elements, features, and structures. The relative size and depiction of these elements may be exaggerated for clarity, illustration, and convenience.

DETAILED DESCRIPTION

The detailed description is provided to assist the reader in gaining a comprehensive understanding of the methods, apparatuses and/or systems described herein. Accordingly, various changes, modifications, and equivalents of the systems, apparatuses, and/or methods described herein will be suggested to those of ordinary skill in the art. Also, descriptions of well-known functions and constructions are omitted to increase clarity and conciseness.

Figure 1:
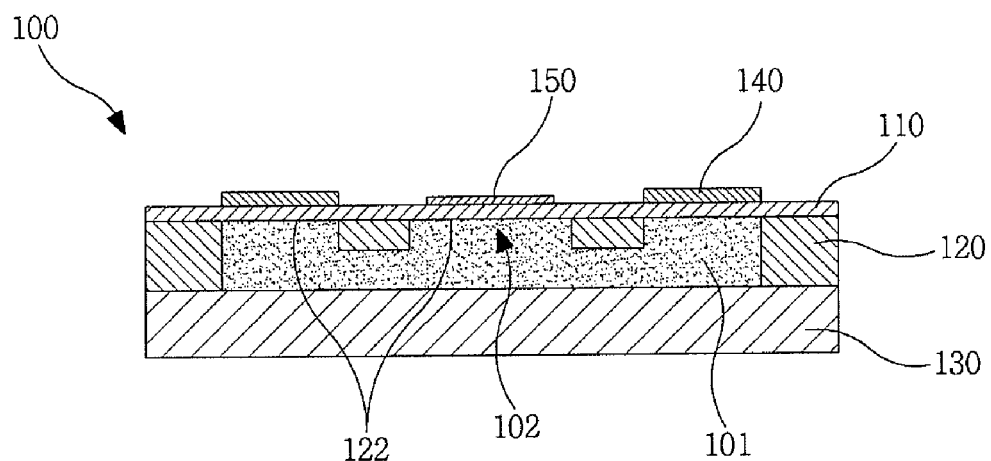
FIG. 1 is a cross-sectional view of a varifocal lens according to a first exemplary embodiment of the present invention.
Figure 2:
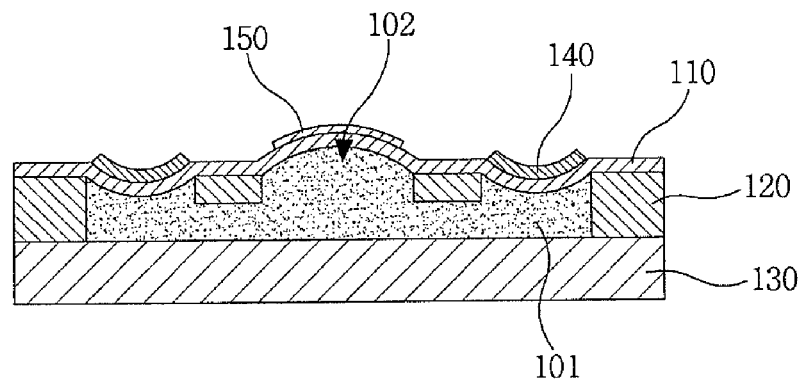
FIG. 2 is a cross-sectional view of a varifocal lens where a fluid lens part is changed to be convex in FIG. 1.

FIG. 1 is a cross-sectional view of a varifocal lens according to a first exemplary embodiment of the present invention. FIG. 2 is a cross-sectional view of a varifocal lens where a fluid lens part is changed to be convex in FIG. 1.

Referring to FIGS. 1 and 2, a varifocal lens 100 includes a membrane 110, a frame 120, a substrate 130, one or more actuators 140, and a restriction lessening member 150.

The membrane 110 is formed of a thin film and changes in shape according to motion of optical fluid 101 contained in the frame 120, causing a curvature of a fluid lens part 102 to be changed. The optical fluid 101 may be made of silicon oil with constant refractive index and viscosity.

The membrane 110 is made of a transparent material so that light incident on the fluid lens part 102 can pass through the membrane 110. The membrane 110 may also seal the optical fluid 101 contained in the frame 120 in cooperation with the substrate 130.

The membrane 110 may be made of a flexible, elastic transparent material, such as polydimethylesiloxane (PDMS). If the frame 120 is square in shape, the membrane 110 may also be correspondingly squared.

One surface of the frame 120 is fixed to the membrane 110. The frame 120 has a receiving hole 122 in the middle to receive the optical fluid 101. The frame 120 has a rim 121 around the receiving hole 122. The frame 120 may be made of silicon. The frame 120 may be square in shape.

The substrate 130 is fixed to the other surface of the frame 120. That is, the substrate 130 is fixed to the frame 120 on the opposite side of the membrane 110. Accordingly, the substrate 130 may seal the optical fluid 101 contained in the receiving hole 122 of the frame 120 in cooperation with the membrane 110. If the frame 120 is square in shape, the substrate 130 may be correspondingly squared. The substrate 130 may be made of a transparent material so that light can pass through the substrate 130. The substrate 130 may be made of glass.

The actuator 140 may enable the curvature of the fluid lens part 102 to change by bending the edge of the fluid lens part 102 formed in the receiving hole 122. More specifically, the actuator 140 may enable the optical fluid 101 in the frame 130 to be moved toward the center of the receiving hole 122 by bending the circumference of the fluid lens part 102 downwards from the outside of the fluid lens part 102.

On the contrary, the actuator 140 may enable the optical fluid 101 in the frame 120 to be moved toward the edge of the receiving hole 122 by bending the circumference of the fluid lens part 102 upwards from the outside of the fluid lens part 102.

Accordingly, the portions corresponding to the receiving hole 122 may be convex, concave or flat in the middle. The curvature of the fluid lens part 102 may be changed accordingly. Accordingly, a refractive power may have a negative value, a positive value or zero (0) due to the changed curvature of the fluid lens part 102. That is, the refractive power may vary in the range between negative and positive values due to the changed curvature of the fluid lens part 102.

The restriction lessening member 150 is adapted to lessen the restrictive force of the edge of the fluid lens part 102. The restriction lessening member 150 has a smaller area than the fluid lens part 102 and is disposed to correspond to an inner side of the fluid lens part 102 except the edge of the fluid lens part 102. For example, the restriction lessening member 150 may be disposed on the outside of the membrane 110.

The restriction lessening member 150 may have a smaller diameter than the fluid lens part 102, and the edge of the restriction lessening member 150 may be provided to be apart by a constant distance from the edge of the fluid lens part 102. This causes the restrictive force of the edge of the fluid lens part 102 to be uniformly applied to the edge of the fluid lens part 102.

The restriction lessening member 150 is made of a transparent material so that light passing through the fluid lens part 102 can be passed through the restriction lessening member 150. The restriction lessening member 150 has a larger Young's modulus than the membrane 110. More specifically, when transformed, the fluid lens part 102 consisting of the membrane 110 and the restriction lessening member 150 needs a greater stress than the fluid lens part 102 consisting only of the membrane 110.

And, when the fluid lens part 102 is transformed to be convex, the restriction lessening member 150 is less transformed than a part of the membrane 110 where the restriction lessening member 150 is not provided. Hence, a central portion of the fluid lens part 102 where the restriction lessening member 150 is provided is less transformed, while the edge of the fluid lens part 102 where the restriction lessening member 150 is not provided is more transformed.

That is, the restrictive force of the edge of the fluid lens part 102 is relatively weak as compared to a case where there is no restriction lessening member 150. As a result, the fluid lens part 102 may have a spherical profile rather than a conic profile.

Accordingly, in a case where the present exemplary embodiment is not employed, since the fluid lens part 102 has a conic profile and has s spherical profile only in the middle, only a small central area of the fluid lens part 102 can be used in an optical application requiring a fluid lens part having a spherical profile. According to the present exemplary embodiment, however, since the fluid lens part 102 has generally a spherical profile, a wider area of the fluid lens part 102 may be used. Hence, the fluid lens part 102 may be suitable for an optical design requiring a fluid lens part having a spherical profile.

If the membrane 110 is made of PDMS, the restriction lessening member 150 may be made of parylene, polyurea, polyurethane or Teflon which is larger in Young's modulus and more transparent than PDMS. Parylene, polyurea, polyurethane or Teflon also has a good elasticity and may thus be beneficial for the restriction lessening member 150.

A difference in Young's modulus between the restriction lessening member 150 and the membrane 110 is large. This may be beneficial in making a slim varifocal lens 100 since the restriction lessening member 150 may be made thin.

Figure 3:
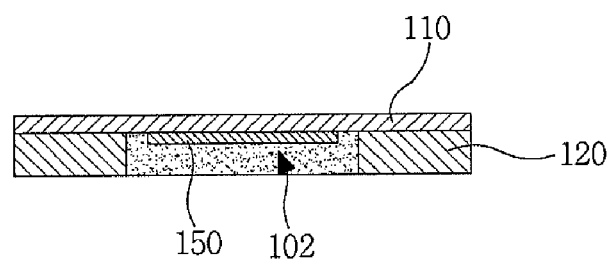
FIGS. 3 and 4 illustrate other examples of a restriction lessening part in FIG. 1.
Figure 4:
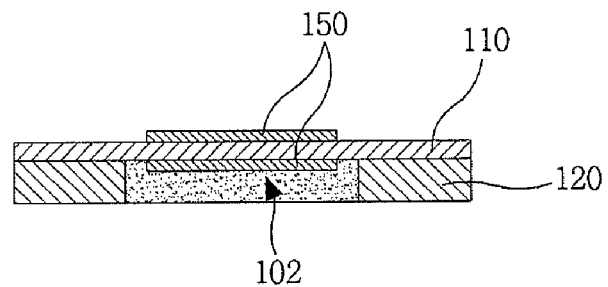

Alternatively, as shown in FIG. 3, the restriction lessening member 150 may be formed on the inner surface of the membrane 110. In this case, the restriction lessening member 150 may have the same configuration as that described above except its position. Furthermore, as shown in FIG. 4, the restriction lessening member 150 may be formed on both surfaces of the membrane 110.

Figure 5:
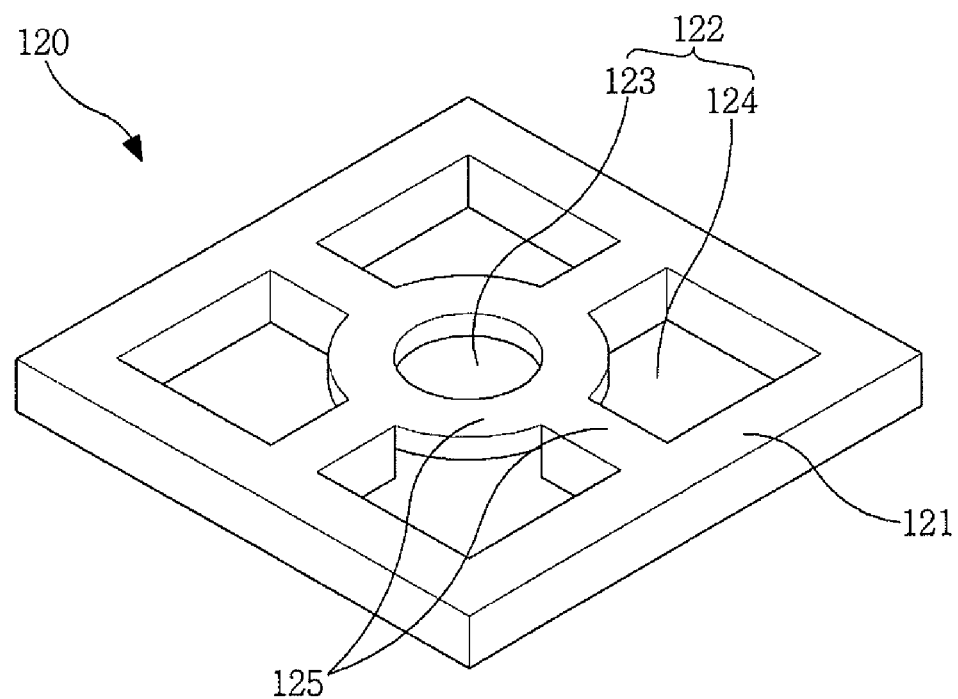
FIG. 5 is a perspective view of a frame in FIG. 1.

As shown in FIG. 5, the frame 120 may further include a barrier wall 125. The barrier wall 125 divides the receiving hole 122 into a central hole 123 and a plurality of edge holes 124 arranged around the central hole 123. The barrier wall 125 may be level with the rim 121 on the side of the membrane 110 and fixed to the membrane 110.

Alternatively, the barrier wall 125 may be formed to be shorter in height than the rim 121 on the side of the substrate 130 so that the central hole 123 and the edge holes 124 can be communicated with each other. Accordingly, the optical fluid 101 contained in the frame 120 may freely move between the central hole 123 and the edge holes 124 by the actuator 140.

The fluid lens part 102 is formed to correspond to the central hole 123. The actuator 140 is provided to correspond to each of the edge holes 124 on the outside of the membrane 110. Each actuator 140 bends downwards portions corresponding to the edge holes 124 from the outside of the membrane 110 so that the optical fluid in the edge holes 124 can be moved to the central hole 123.

On the contrary, each actuator 140 bends upwards portions corresponding to the edge holes 124 from the outside of the fluid lens part 102 so that the optical fluid in the central hole 123 can be moved to the edge holes 124.

Accordingly, the portions corresponding to the central hole 123 may be made convex, concaved or flat. Hence, the curvature of the fluid lens part 102 may be changed and the refractive power due to the changed curvature may thus vary in the range between negative and positive values.

The actuator 140 may operate at a low power and a high speed. Examples of the actuator 140 include a typical polymer actuator and a piezoelectric actuator.

The polymer actuator generates displacement using expansion and contraction of polymer due to electric field. The polymer may be an electro active polymer or an ionic polymer.

The piezoelectric actuator generates displacement using expansion and contraction of a piezoelectric element due to an inverse piezoelectric effect. The actuators 140 may be configured such that the optical fluid 101 uniformly flows in to the center of the central hole 123 and flows out of the center of the central hole 123. Furthermore, the edge holes 124 are formed in the same shape.

Figure 6:
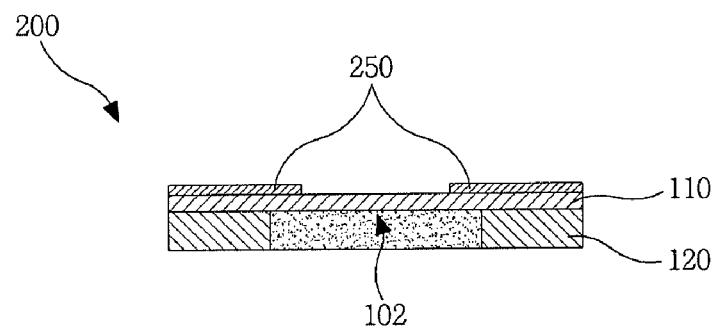
FIG. 6 is a cross-sectional view of a varifocal lens according to a second exemplary embodiment of the present invention.
Figure 7:
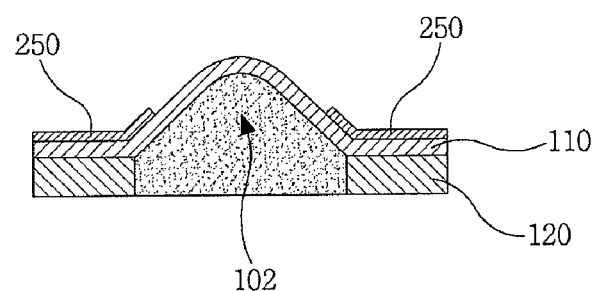
FIG. 7 is a cross-sectional view of a varifocal lens where a fluid lens part is changed to be convex in FIG. 6.

FIG. 6 is a cross-sectional view of a varifocal lens according to a second exemplary embodiment of the present invention. FIG. 7 is a cross-sectional view of a fluid lens part changed to be convex in FIG. 6. A difference between the present exemplary embodiment and the first exemplary embodiment will be described in detail.

Referring to FIGS. 6 and 7, the varifocal lens 200 includes a restriction reinforcing member 250 rather than the restriction lessening member 150 in the first exemplary embodiment.

The restriction reinforcing member 250 is adapted to reinforce the restrictive force of the edge of the fluid lens part 102. The restriction reinforcing member 250 is disposed to correspond to an area including the edge of the fluid lens part 102 except the central portion of the fluid lens part 102. For example, the restriction reinforcing member 250 may be provided on the outer surface of the membrane 110. The restriction reinforcing member 250 may be formed to have a shorter inner diameter than the fluid lens part 102 and a larger outer diameter than the fluid lens part 102.

The inner end of the restriction reinforcing member 250 is spaced by a constant distance from the edge of the fluid lens part 102. This causes the restrictive force of the edge of the fluid lens part 102 to be uniformly applied to the edge of the fluid lens part 102.

The restriction reinforcing member 250 is made of a transparent material so that light passing through the fluid lens part 102 can pass through the restriction reinforcing member 250. The restriction reinforcing member 250 also has a greater Young's modulus than the membrane 110. Accordingly, when transformed, the fluid lens part 102 consisting of the membrane 110 and the restriction reinforcing member 250 needs a greater stress than the fluid lens part 102 consisting only of the membrane 110.

Accordingly, the area including the edge of the fluid lens part 102 where the restriction reinforcing member 250 is provided is less transformed, while the central portion of the fluid lens part 102 where the restriction reinforcing member 250 is not provided is more transformed.

That is, the restrictive force of the edge of the fluid lens part 102 is relatively reinforced as compared to a case where there is no restriction reinforcing member 250. Accordingly, the fluid lens part 102 may have a sharper conic profile. As a result, this may be more suitable for an optical design requiring a fluid lens part 102 with a sharper conic profile.

If the membrane 110 is made of PDMS, the restriction reinforcing member 250 may be made of parylene, polyurea, polyurethane or Teflon which is larger in Young's modulus and more transparent than PDMS. Since parylene, polyurea, polyurethane or Teflon also has a good elasticity, it may be beneficial when it is applied to the restriction reinforcing member 250.

A difference in Young's modulus between the restriction reinforcing member 250 and the membrane 110 is large. This may be beneficial in making a slim varifocal lens 200 since the restriction reinforcing member 250 may be made thin. A distance between the inner end of the restriction reinforcing member 250 and the edge of the fluid lens part 102 may be a factor to determine how sharp conic profile the fluid lens part 102 has.

Figure 8:
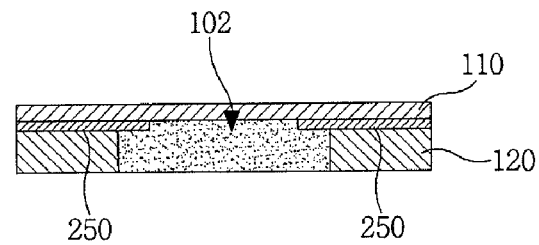
FIGS. 8 to 11 illustrate other examples of a restriction reinforcing part in FIG. 6.
Figure 9:
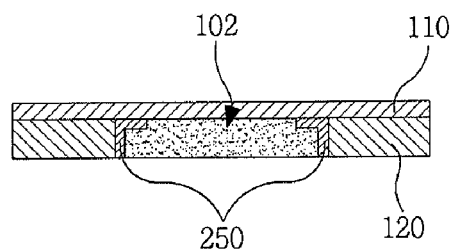
Figure 10:
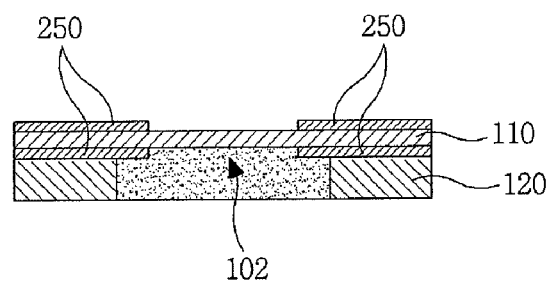
Figure 11:
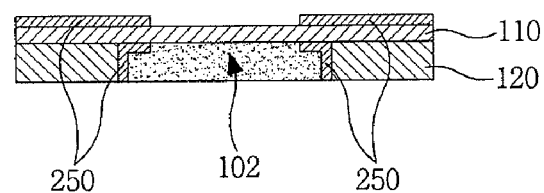

Alternatively, as shown in FIG. 8, the restriction reinforcing member 250 may be formed on the inner surface of the membrane 110. In this case, the restriction reinforcing member 250 may have the same configuration as that described above except its position. In another example, as shown in FIG. 9, the restriction reinforcing member 250 may be formed across the inner surface of the membrane 110 and the inner wall of the frame 120. In another example, as shown in FIG. 10, the restriction reinforcing member 250 may be formed on the inner and outer surfaces of the membrane 110. In another example, as shown in FIG. 11, the restriction reinforcing member 250 may be formed on the outer surface of the membrane 110 and across the inner surface of the membrane 110 and the inner wall of the frame 120.

Figure 12:
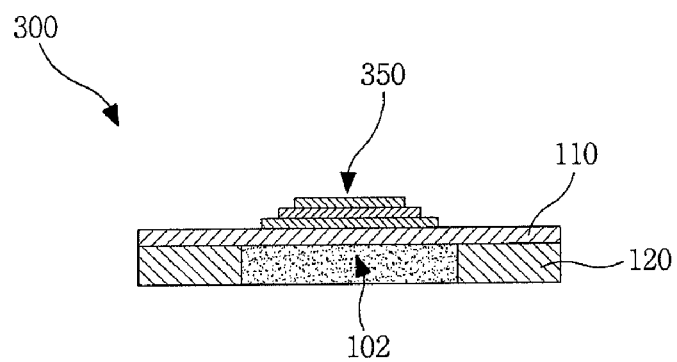
FIG. 12 is a cross-sectional view of a varifocal lens according to a third exemplary embodiment of the present invention.

FIG. 12 is a cross-sectional view of a varifocal lens according to a third exemplary embodiment of the present invention. A difference between the present exemplary embodiment and the first and second exemplary embodiments will be described in detail.

Referring FIG. 12, a varifocal lens 300 includes a lens shape altering member 350 rather than the restriction lessening member 150 in the first embodiment and the restriction reinforcing member 250 in the second embodiment.

The lens shape altering member 350 is intended to form the fluid lens part 102 in a predetermined shape. The lens shape altering member 350 is provided to correspond to at least a portion of the fluid lens part 102. The lens shape altering member 350 may be provided on at least one of outer and inner surfaces of the membrane 110.

The lens shape altering member 350 may be formed to correspond to the shape of the fluid lens part 102 to be changed. For example, when the fluid lens part 102 is changed to be convex, the lens shape altering member 350 may be formed to have a smaller curvature in the middle as will be described below.

The lens shape altering member 350 is formed by stacking a plurality of polymer layers with different areas on the outer surface of the fluid lens part 102. The polymer layers are stacked on the same axis as the center of the fluid lens part 102 and are stacked to have smaller areas as they become away from the fluid lens part 102. That is, the lens shape altering member 350 becomes thicker toward the center of the fluid lens part 102.

The lens shape altering member 350 is made of a transparent material so that light passing through the fluid lens part 102 pass through the lens shape altering member 350. The lens shape altering member 350 has the same or greater Young's modulus as or than the membrane 110. When the fluid lens part 102 is changed to be convex or concave and both the membrane 110 and the lens shape altering member 350 are changed in shape accordingly, the membrane 110 is less transformed since the lens shape altering member 350 is less transformed than the membrane 110 where the lens shape altering member 350 is not stacked.

In this case, a thicker portion of the lens shape altering member 350 has a larger restrictive force than a thinner portion of the lens shape altering member 350. Hence, when the fluid lens part 102 is changed to be convex, the curvature of the fluid lens part 102 becomes smaller toward the center of the fluid lens part 102. Since the fluid lens part 102 has a shape corresponding to the lens shape altering member 350, the fluid lens part 102 may be changed to an aspheric lens part. Accordingly, the present embodiment may be applied to an optical design requiring an aspheric lens part.

If the membrane is made of PDMS, the lens shape altering member 350 may be made of PDMS, or parylene, polyurea, polyurethane or Teflon which is larger in Young's modulus and more transparent than PDMS. Parylene, polyurea, polyurethane or Teflon also has a good elasticity and may thus be beneficial in applying to the lens shape altering member 350.

A difference in Young's modulus between the lens shape altering member 350 and the membrane is large. This may cause a thin lens shape altering member 350. Furthermore, since an aspheric lens part can be made from the lens shape altering member 350, the lens shape altering member 350 may be beneficial in making a slim varifocal lens 300 as compared to an aspheric lens part which is made by stacking a plurality of lenses.

Figure 13:
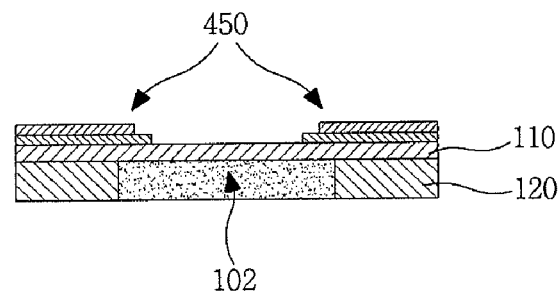
FIGS. 13 to 16 illustrate other examples of a lens shape altering member in FIG. 12.

In another example, as shown in FIG. 13, a lens shape altering member 450 is formed by stacking a plurality of ring-shaped polymer layers with different areas on the outer surface of the fluid lens part 102. The polymer layers are stacked to surround the edge of the fluid lens part 102 and are stacked such that areas of inner spaces of the polymer layers become wider as they are away from the fluid lens part 102. In this case, when the fluid lens part 102 is changed to be convex, the edge of the fluid lens part 102 may be narrow.

Figure 14:
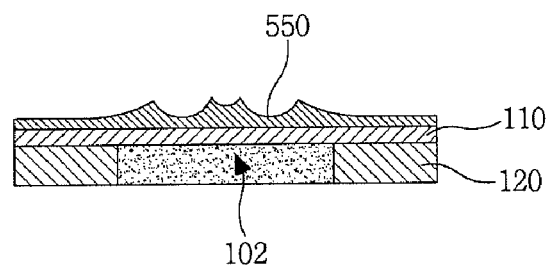

In another example, as shown in FIG. 14, a lens shape altering member 550 may be formed in a concavo-convex shape. In this case, when the fluid lens part 102 is changed to be convex, the fluid lens part 102 may have a concavo-convex shape opposite to the concavo-convex shape of the lens shape altering member 550.

Figure 15:
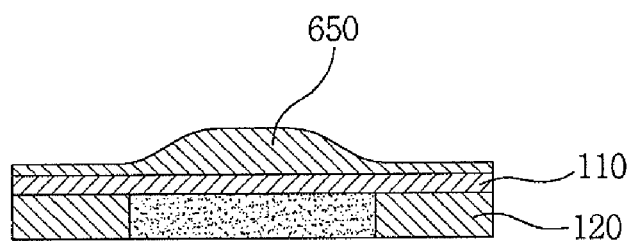

In another example, as shown in FIG. 15, a lens shape altering member 650 may be shaped to be convex in the middle. In this case, when the fluid lens part 102 is changed to be convex, the fluid lens part 102 may be formed to have a smaller curvature toward the center of the fluid lens part 102.

Figure 16:
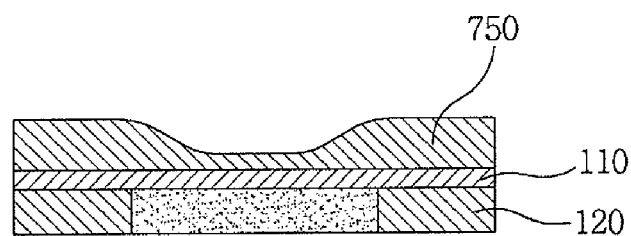

In another example, as shown in FIG. 16, a lens shape altering member 750 may be shaped to be concave in the middle. In this case, when the fluid lens part 102 is changed to be convex, the fluid lens part 102 may be formed to have a larger curvature toward the center of the fluid lens part 102. It should be understood that the lens shape altering member may be changed to have a different shape depending on a shape of the fluid lens part 102.

A method of manufacturing the varifocal lens 300 thus configured according to the third exemplary embodiment of the present invention will be described with reference to FIGS. 17A to 17G. In this case, the lens shape altering member 650 shown in FIG. 15 is used.

Figure 17A:
FIGS. 17A to 17G illustrates a method of manufacturing a varifocal lens according to a third exemplary embodiment of the present invention.

Referring to FIG. 17A, a mold 811 is provided to form the lens shape altering member 650 in a predetermined shape. In order for the lens shape altering member 650 to be convex in the middle, the mold 811 is formed with its upper surface which has a shape opposite to that of the lens shape altering member 650. The upper surface of the mold 811 may be anti-stiction coated so that the lens shape altering member 650 can easily be separated from the mold 811 after the lens shape altering member 650 is formed on the mold 811.

Figure 17B:
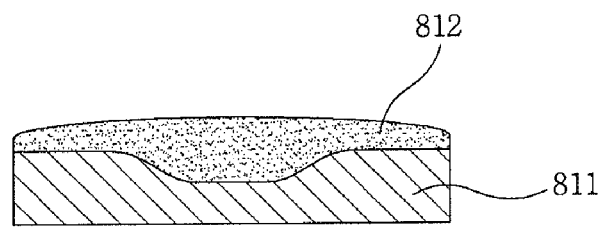

As shown in FIG. 17B, a liquid material 812 for forming a transparent lens shape altering member is supplied on the mold 811. The liquid material 812 may be supplied on the mold 811 by a dropping or dispensing process. The liquid material 812 may be parylene, polyurea, polyurethane, or Teflon.

Figure 17C:
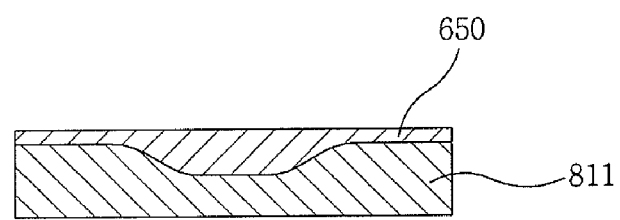

As shown in FIG. 17C, the liquid material 812 is processed to have a flat upper surface. The upper surface of the liquid material 812 may be made flat using an applicator. The flat liquid material 812 is then cured, for example, by a heating process to form a lens shape altering member 650.

Figure 17D:
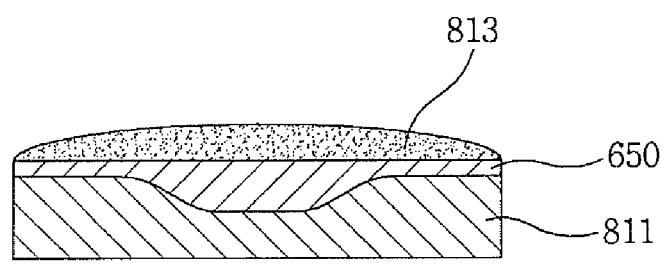

As shown in FIG. 17D, a liquid material 813 for forming a transparent membrane is provided on the lens shape altering member 650. The liquid material 813 may be provided on the lens shape altering member 650 by a dropping or dispensing process. The liquid material 813 is made of material with a lower Young's modulus than the liquid material 812. For example, the liquid material 813 may be PDMS when the liquid material 812 is parylene, polyurea, polyurethane, or Teflon.

Figure 17E:
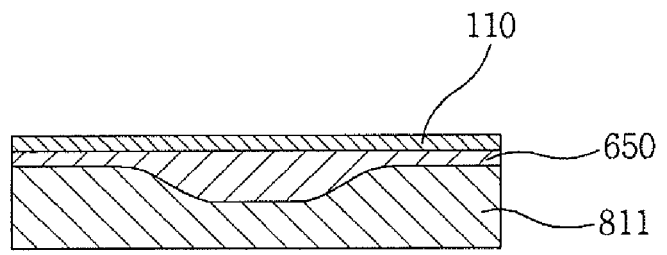

As shown in FIG. 17E, the liquid material 813 is made flat to have a predetermined thickness and cured to form the membrane 110. This may be performed in the same process that the lens shape altering member 650 is formed.

Figure 17F:
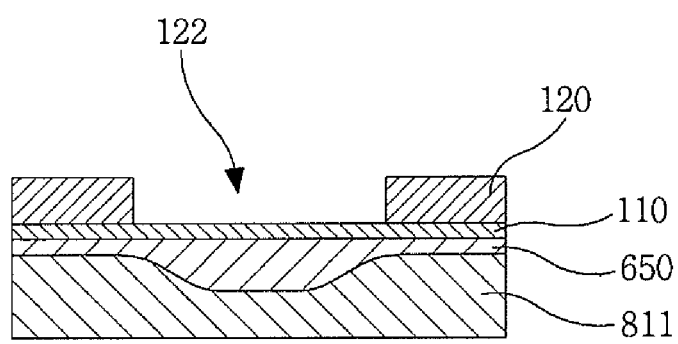

As shown in FIG. 17F, the frame 120 is provided and is then fixed to the membrane 110. The frame 120 has a receiving hole 122 in the middle to receive the optical fluid 101. The frame 120 may be made of silicon oil. The membrane 110 may be fixed to the frame 120 by matching an alignment mark on the frame 120 with an alignment mark on the mold 811. Hereby, the frame 120 can be fixed to the membrane 110 at corresponding positions to each other.

When the membrane 110 is made of PDMS and the frame 120 is made of silicon, the joint surface of the membrane 110 with the frame 120 may be subjected to oxygen plasma process before the frame 120 is fixed to the membrane 110. Among PDMS components of the membrane 110, components except silicon and oxygen are removed by the oxygen plasma process. Hence, the joint of the membrane 110 with the frame 120 can be attached or fixed together without the use of an additional adhesive agent.

Figure 17G:
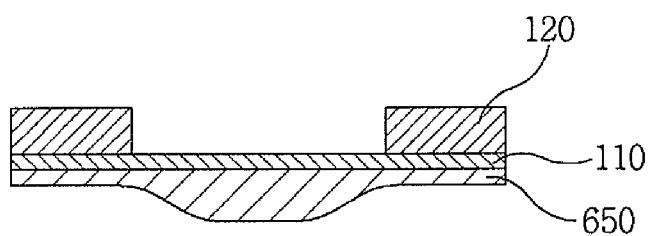

As shown in FIG. 17G, the mold 811 is removed from the lens shape altering member 650. If the mold 811 is anti-stiction coated, the lens shape altering member 650 can easily be separated from the mold 811.

In a process of forming the frame 120, as shown in FIG. 5, the barrier wall 125 may be further formed to divide the receiving hole 122 into the central hole 123 and the edge holes 124.

The barrier wall 125 may be level with the rim 121 of the frame 120 on the side of the membrane 110 and be fixed to the membrane 110. Alternatively, the barrier wall 125 may be formed to be shorter in height than the rim 121 on the side of the substrate 130 so that the optical fluid 101 contained in the frame 120 may freely move between the central hole 123 and the edge holes 124.

Although not shown, after the frame 120 is fixed to the membrane 110 or the mold 811 is removed from the lens shape altering member 650, the optical fluid 101 is received in the receiving hole 122 of the frame 120. The optical fluid 101 may be silicon oil with a constant refractive index and viscosity.

The transparent substrate 130 is attached with an adhesive agent to the frame 120 on an opposite side of the membrane 110 so that the optical fluid 101 received in the receiving hole 122 of the frame 120 can be sealed.

The actuator 140 is attached around the fluid lens part 102. The actuator 140 is adapted to change the curvature of the fluid lens part 102 which is formed at the central portion of the receiving hole 122. When the fluid lens part 102 is formed at the central hole 123, each actuator 140 may be attached to correspond to each of the edge holes 124 from the outside of the membrane 110. Before the substrate 130 is fixed to the frame 120, the actuator 140 may be attached to the membrane 110. Accordingly, the process is not limited to being performed in the above-mentioned order.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A varifocal lens comprising:
a membrane;
a frame which is fixed to the membrane and comprises a receiving hole formed in a middle of the frame;
a transparent substrate which is fixed to the frame to seal optical fluid in the receiving hole;
at least one actuator which changes a curvature of a fluid lens part by bending a circumference portion of the fluid lens part disposed about a central portion of the receiving hole; and
a restriction lessening member which is adapted to lessen a restrictive force of an edge of the fluid lens part, the restriction lessening member being made of a transparent material, and comprising an area smaller than the fluid lens part to correspond to an inner portion of the fluid lens part and not to the edge of the fluid lens part, and has a Young's modulus that is larger than a Young's modulus of the membrane.

2. The varifocal lens of claim 1, wherein the restriction lessening member is disposed on an outer surface of the membrane.

3. The varifocal lens of claim 2, wherein the restriction lessening member is further disposed on an inner surface of the membrane.

4. The varifocal lens of claim 1, wherein the restriction lessening member is disposed on an inner surface of the membrane.

5. The varifocal lens of claim 1, wherein the membrane is made of polydimethylesiloxane (PDMS), and the restriction lessening member is made of one of parylene, polyurea, polyurethane, and Teflon.

6. The varifocal lens of claim 1,
wherein the frame further comprises a barrier wall to divide the receiving hole into a central hole, in which the fluid lens part is formed, and a plurality of edge holes, which are arranged around the central hole and where the at least one actuator is disposed to correspond to at least one of the plurality of edge holes; and
wherein the barrier wall is shorter in height than a rim of the frame on a side of the substrate so that the central hole and the plurality of edge holes can communicate with each other.

7. A varifocal lens comprising:
a transparent substrate;
a frame which is fixed to the transparent substrate and comprises an outer frame and an inner frame defining an inner hole and a peripheral hole which communicates with the inner hole;
a membrane fixed to the outer frame and the inner frame, to seal optical fluid in the inner hole and the peripheral hole, the membrane comprising a central lens portion corresponding to the inner hole and a peripheral actuated portion corresponding to the peripheral hole;
at least one actuator which changes a curvature of the central lens portion of the membrane by bending the peripheral actuated portion of the membrane; and
a restriction reinforcing member, separate from the inner frame and the outer frame, which is adapted to reinforce a restrictive force of an edge of the central lens portion, the restriction reinforcing member being made of a transparent material, and being disposed to correspond to an area including the edge of the central lens portion and not a central portion of the central lens portion, and has a Young's modulus that is larger than a Young's modulus of the membrane.

8. The varifocal lens of claim 7, wherein the restriction reinforcing member is disposed on an outer surface of the membrane.

9. The varifocal lens of claim 8, wherein the restriction reinforcing member is further disposed on an inner surface of the membrane.

10. The varifocal lens of claim 7, wherein the restriction reinforcing member is disposed on an inner surface of the membrane.

11. The varifocal lens of claim 7, wherein the restriction reinforcing member is disposed across an inner surface of the membrane and an inner wall of the frame.

12. The varifocal lens of claim 11, wherein the restriction reinforcing member is further disposed on an outer surface of the membrane.

13. The varifocal lens of claim 7, wherein the membrane is made of polydimethylesiloxane (PDMS), and the restriction reinforcing member is made of one of parylene, polyurea, polyurethane, and Teflon.

14. The varifocal lens of claim 7,
wherein the frame further comprises a barrier wall to partition the inner hole, in which the fluid lens part is formed, and a plurality of peripheral holes, which are arranged around the inner hole and where the at least one actuator is disposed to correspond to the plurality of peripheral holes; and
wherein the barrier wall is shorter in height than a rim of the frame on a side of the substrate so that the inner hole and the plurality of peripheral holes communicate with each other.

15. A varifocal lens comprising:
- a transparent substrate;
- a frame which is fixed to the transparent substrate and comprises an outer frame and an inner frame defining an inner hole and a peripheral hole which communicates with the inner hole;
- a membrane fixed to the outer frame and the inner frame, to seal optical fluid in the inner hole and the peripheral hole, the membrane comprising a central lens portion corresponding to the inner hole and a peripheral actuated portion corresponding to the peripheral hole;
- at least one actuator which changes a curvature of the central lens portion of the membrane by bending the peripheral actuated portion of the membrane; and
- a lens shape altering member which is fixed to the membrane and is separate from the inner frame and the outer frame and is adapted to transform the central lens portion into a predetermined shape, the lens shape altering member being made of a transparent material, and being disposed to correspond to at least a portion of the central lens portion, and has a Young's modulus equal to or greater than a Young's modulus of the membrane.

16. The varifocal lens of claim 15, wherein the lens shape altering member is disposed on an outer surface of the membrane.

17. The varifocal lens of claim 16, wherein the lens shape altering member is further disposed on an inner surface of the membrane.

18. The varifocal lens of claim 15, wherein the lens shape altering member is disposed on an inner surface of the membrane.

19. The varifocal lens of claim 15, wherein the lens shape altering member comprises a plurality of stacked polymer layers with different areas.

20. The varifocal lens of claim 15, wherein the lens shape altering member is convex in the middle.

21. The varifocal lens of claim 15, wherein the lens shape altering member is concave in the middle.

22. The varifocal lens of claim 15, wherein the lens shape altering member is concavo-convex.

23. The varifocal lens of claim 15, wherein the membrane is made of polydimethylesiloxane (PDMS), and the lens shape altering member is made of one of PDMS, parylene, polyurea, polyurethane, and Teflon.

24. The varifocal lens of claim 15,
- wherein the frame further comprises a barrier wall to partition the inner hole, in which the fluid lens part is formed, and a plurality of peripheral holes, which are arranged around the inner hole and where the at least one actuator is disposed to correspond to at least one of the peripheral holes; and
- wherein the barrier wall is shorter in height than a rim of the frame on a side of the substrate so that the inner hole and the plurality of peripheral holes communicate with each other.

* * * * *